(12) United States Patent
Hasegawa et al.

(10) Patent No.: US 11,710,878 B2
(45) Date of Patent: Jul. 25, 2023

(54) ALL SOLID STATE BATTERY (71) Applicant: Toyota Jidosha Kabushiki Kaisha, Toyota (JP)

(72) Inventors: Hajime Hasegawa, Aichi-ken (JP); Takumi Tanaka, Miyoshi (JP); Satomi Yamamoto, Miyoshi (JP); Koichi Tanimoto, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 114 days.

(21) Appl. No.: 17/159,428

(22) Filed: Jan. 27, 2021

(65) Prior Publication Data

US 2021/0242544 A1 Aug. 5, 2021

(30) Foreign Application Priority Data

Jan. 31, 2020 (JP) .................. 2020-015599

(51) Int. Cl.
*H01M 50/536* (2021.01)
*H01M 50/533* (2021.01)
*H01M 10/0585* (2010.01)

(52) U.S. Cl.
CPC ..... *H01M 50/536* (2021.01); *H01M 10/0585* (2013.01); *H01M 50/533* (2021.01)

(58) Field of Classification Search
CPC ............ H01M 50/536; H01M 50/533; H01M 50/531; H01M 50/586; H01M 50/59; H01M 10/0585; H01M 10/052; H01M 10/647; H01M 10/0413; H01M 10/04; H01M 10/281; H01M 10/28; H01M 10/058; H01M 10/0525; H01M 10/0562; H01M 10/4235; H01M 10/42
See application file for complete search history.

(56) References Cited

U.S. PATENT DOCUMENTS

| | | | | |
|---|---|---|---|---|
| 2003/0232243 | A1* | 12/2003 | Hong .................. | H01M 50/536 29/623.4 |
| 2009/0035648 | A1* | 2/2009 | Kimura ............... | H01M 10/613 429/120 |

(Continued)

FOREIGN PATENT DOCUMENTS

| | | |
|---|---|---|
| CN | 110534667 A | 12/2019 |
| JP | 2004-253155 A | 9/2004 |

(Continued)

OTHER PUBLICATIONS

English Translation of JP 2016136490A; Manufacturing method of lamination type all solid battery; Toyota Motor corp; Jul. 28, 2016 (Year: 2016).*

*Primary Examiner* — Matthew T Martin
*Assistant Examiner* — Adam J Francis
(74) *Attorney, Agent, or Firm* — Dinsmore & Shohl LLP (57) ABSTRACT

An all solid state battery in which positional displacement of a plurality of cells arranged along a thickness direction can be prevented is provided. The all solid state battery includes a plurality of cells connected in series, wherein the all solid state battery includes a cell unit A and a cell unit B, a first current collector A in the cell A and a second current collector B in the cell B are arranged to face each other, the first current collector A includes a tab A, the second current collector B includes a tab B, and the tab A and the tab B are fixed by a fixing portion.

8 Claims, 7 Drawing Sheets

(56) References Cited

U.S. PATENT DOCUMENTS

| | | | |
|---|---|---|---|
| 2009/0047575 A1* | 2/2009 | Abe | H01M 50/572 |
| | | | 429/163 |
| 2011/0129718 A1 | 6/2011 | Lee | |
| 2014/0255778 A1* | 9/2014 | Huh | H01M 4/0404 |
| | | | 429/211 |
| 2017/0040635 A1* | 2/2017 | Choi | B23K 35/222 |
| 2018/0006348 A1* | 1/2018 | Ebisuzaki | H01M 10/659 |
| 2018/0248228 A1 | 8/2018 | Honda | |
| 2018/0294469 A1* | 10/2018 | Hasegawa | H01M 10/0562 |
| 2018/0301761 A1* | 10/2018 | Miyake | H01M 50/54 |
| 2019/0214677 A1 | 7/2019 | Yamada | |
| 2019/0363317 A1 | 11/2019 | Honda et al. | |
| 2020/0259128 A1 | 8/2020 | Tanaka et al. | |

FOREIGN PATENT DOCUMENTS

| | | | |
|---|---|---|---|
| JP | 2004-303535 A | | 10/2004 |
| JP | 2011-181520 A | | 9/2011 |
| JP | 2016136490 A | * | 7/2016 |
| JP | 2017-195076 A | | 10/2017 |
| JP | 2018-142534 A | | 9/2018 |
| JP | 2019-207873 A | | 12/2019 |
| JP | 2020-136261 A | | 8/2020 |
| KR | 2011-0061281 A | | 6/2011 |
| KR | 2019-0085458 A | | 7/2019 |

\* cited by examiner

ALL SOLID STATE BATTERY

CROSS REFERENCE TO RELATED APPLICATIONS

This nonprovisional application claims priority to Japanese Patent Application No. 2020-015599 filed on Jan. 31, 2020, with the Japan Patent Office, which is incorporated herein by reference in its entirety.

TECHNICAL FIELD

The present disclosure relates to an all solid state battery.

BACKGROUND ART

An all solid state battery is a battery including a solid electrolyte layer between a cathode active material layer and an anode active material layer, and one of the effects thereof is that the simplification of a safety device may be more easily achieved compared to a liquid-based battery including a liquid electrolyte containing a flammable organic solvent.

Meanwhile, a battery (bipolar-type battery) including a bipolar electrode, in which a cathode active material layer is arranged on one surface of a current collector and an anode active material layer is arranged on the other side of the current collector, has been known. For example, Japanese Patent Application Laid-Open (JP-A) No. 2004-253155 discloses a bipolar-type battery wherein a part of surrounding portion of electrode is not subjected to an insulation treatment and a part of a current collector is exposed.

Japanese Patent Application Laid-Open 2017-195076 discloses a bipolar type battery wherein a first solid electrolyte layer is arranged between a bipolar electrode and a cathode in a layering direction of the bipolar type battery, a second solid electrolyte layer is arrange between the bipolar electrode and an anode in the layering direction of the bipolar type battery, and the first solid electrolyte layer and the second electrolyte layer are larger than the cathode and the anode with respect to in-plane direction of the bipolar type battery.

Japanese Patent Application Laid-Open 2011-181520 discloses a bipolar type battery wherein a current collector is a metal foil of which at least anode side is covered with a non-ion conductive but electron conductive layer.

SUMMARY OF DISCLOSURE

Technical Problem

When the bipolar electrode, in which a cathode active material layer is arranged on one surface of a current collector and an anode active material layer is arranged on the other side of the current collector, is used, depending on conditions for pressing to densify each layer during production, difference in elasticity between the anode active material layer and the cathode active material layer may cause deformation of a current collector, which may generate a crack in the anode active material layer or the cathode active material layer. In particular, the generation of the crack is remarkable in an all solid state battery using an inorganic solid electrolyte since it has to be pressed with extremely high pressure during its production.

In contrast, an all solid state battery wherein a plurality of cells are connected in series can be obtained by preparing a plurality of the cells respectively including an anode current collector, an anode active material layer, a solid electrolyte layer, a cathode active material layer and a cathode current collecting layer in this order, and arranging the plurality of the cells in a thickness direction. In this case, the cell in which an active material layer is arranged on only one surface side of the current collector is used, and thus the crack in the active material layer due to pressing does not easily occur compared with the bipolar electrode.

Meanwhile, in an all solid state battery wherein a plurality of cells are arranged along a thickness direction, each cell may move to in-plane direction (orthogonal direction to the thickness direction) during being pressed (during pressing a plurality of the cells after arranging the cells along the thickness direction) and shift in positions of the cells tends to occur. The shift in positions of the cells can be a cause of short circuit. The present disclosure has been made in view of the above circumstances, and a main object thereof is to provide an all solid state battery in which the shift in positions of a plurality of the cells arranged along the thickness direction can be prevented.

Solution to Problem

In order to achieve the object, the present disclosure provides an all solid state battery comprising a plurality of cells arranged along a thickness direction and connected in series; the all solid state battery includes a cell A and a cell B as the cells; the cell A includes a first current collector A, a first active material layer A, a solid electrolyte layer A, a second active material layer A and a second current collector A, in this order; the cell B includes a first current collector B, a first active material layer B, a solid electrolyte layer B, a second active material layer B and a second current collector B, in this order; the first current collector A in the cell A and the second current collector B in the cell B are arranged to face each other; the first current collector A includes a tab A at a position not overlapping with the first active material layer A in plan view; the second current collector B includes a tab B at a position not overlapping with the second active material layer B in plan view; and the tab A and the tab B are fixed by a fixing portion.

According to the present disclosure, the tab A and the tab B in the cell A and the cell B are fixed by the fixing portion, and thus the shift in positions of a plurality of the cell unit arranged along the thickness direction can be prevented in the all solid state battery.

In the disclosure, a first insulating portion may be arranged on a surface of the tab B facing away from the tab A, and an outer edge of the first insulating portion may be located on an outer side with respect to an outer edge of the tab A in plan view.

In the disclosure, an outer edge of the tab B may be located on an outer side with respect to the outer edge of the tab A in plan view.

In the disclosure, the tab A and the tab B may be bent so as the first insulating portion is on an outside, and the fixing portion may be located on an inner side with respect to a bending center.

In the disclosure, an insulating adhesive portion may be arranged on at least one surface of the fixing portion.

In the disclosure, the fixing portion may be a welded portion.

The present disclosure also provides an all solid state battery comprising a plurality of cell units arranged along a thickness direction and connected in series; the all solid state battery includes a cell unit A and a cell unit B as the cell units; the cell unit A includes: a first current collector A; a first active material layer AX, a solid electrolyte layer AX, a second active material layer AX and a second current collector AX, arranged in order from a first surface side of the first current collector A; and a first active material layer AY, a solid electrolyte layer AY, a second active material layer AY and a second current collector AY, arranged in order from a second surface side opposite to the first surface side of the first current collector A; the cell unit B includes: a first current collector B; and a first active material layer BX, a solid electrolyte layer BX, a second active material layer BX and a second current collector BX, arranged in order from a first surface side of the first current collector B; a first active material layer BY, a solid electrolyte layer BY, a second active material layer BY and a second current collector BY, arranged in order from a second surface side opposite to the first surface side of the first current collector B; the second current collector AY in the cell unit A, and the second current collector BX in the cell unit B are arranged to face each other, interposing a second insulating portion; the second current collector AX includes a tab AX at a position not overlapping with the second active material layer AX in plan view; the second current collector AY includes a tab AY at a position not overlapping with the second active material layer AY in plan view; the first current collector B includes a tab B at a position not overlapping with the first active material layer BX and the first active material layer BY in plan view; and the tab AX, the tab AY, and the tab B are fixed by a fixing portion.

According to the present disclosure, the tab AX, the tab AY, and the tab B in the cell unit A and the cell unit B are fixed by the fixing portion, and thus the shift in positions of a plurality of the cells arranged along the thickness direction can be prevented in the all solid state battery.

In the disclosure, a first insulating portion may be arranged on a surface of the tab AX facing away from the tab AY, and an outer edge of the first insulating portion may be located on an outer side of an outer edge with respect to the tab B in plan view.

In the disclosure, an outer edge of the tab AX may be located on the outer side with respect to the outer edge of the tab B in plan view.

In the disclosure, the tab AX, the tab AY, and the tab B may be bent so as the first insulating portion is on an outer side, and the fixing portion may be located on an inner side with respect to a bending center.

In the disclosure, an insulating adhesive portion may be arranged on at least one surface of the fixing portion.

In the disclosure, the fixing portion may be a welded portion.

Effects of Disclosure

The all solid state battery in the present disclosure exhibits an effect such that the shift in positions of a plurality of the cells arranged along the thickness direction can be prevented.

DESCRIPTION OF EMBODIMENTS

The all solid state battery in the present disclosure is hereinafter explained in details. In the descriptions of the present application, when it is expressed as, on "surface side" of one member, the other member is arranged, all of when the other member is arranged directly on the surface of one member, when the other member is arranged on the surface of one member interposing an additional member, and when the other member is arranged above the surface of one member setting a specified space in-between, can be included, unless technically contradicted. In addition, in each drawing described as below, the size and the shape of each portion are appropriately exaggerated in order to be understood easily. Further, in each drawing, hatchings or reference signs are appropriately omitted.

The all solid state battery in the present disclosure are roughly classified into an embodiment using cells (first embodiment) and an embodiment using cell units (second embodiment).

A. First Embodiment

Figure 1:
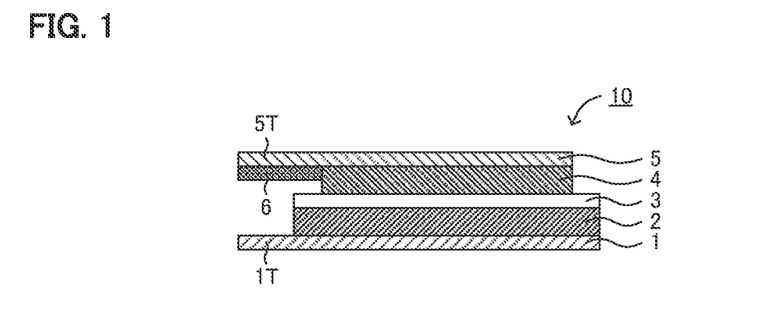
FIG. 1 is a schematic cross-sectional view exemplifying the cell in a first embodiment.
Figure 2:
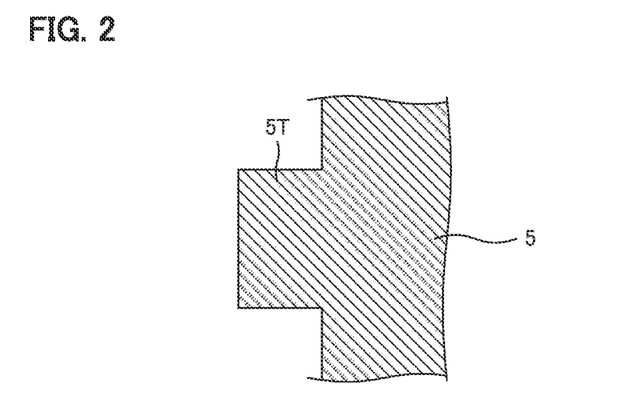
FIG. 2 is a schematic plan view exemplifying the tab in the first embodiment.

FIG. 1 is a schematic cross-sectional view exemplifying the cell in the first embodiment. Cell 10 shown in FIG. 1 includes first current collector 1, first active material layer 2, solid electrolyte layer 3, second active material layer 4 and second current collector 5, in this order. The first current collector 1 includes tab 1T at a position not overlapping with the first active material layer 2 in plan view, and the second current collector 5 includes tab 5T at a position not overlapping with the second active material layer 4 in plan view. In addition, first insulating portion 6 is arranged on one surface side of the tab 5T. FIG. 2 is a schematic plan view exemplifying the tab in the first embodiment, and second current collector 5 shown in FIG. 2 includes tab 5T which is in a square shape.

Figure 3:
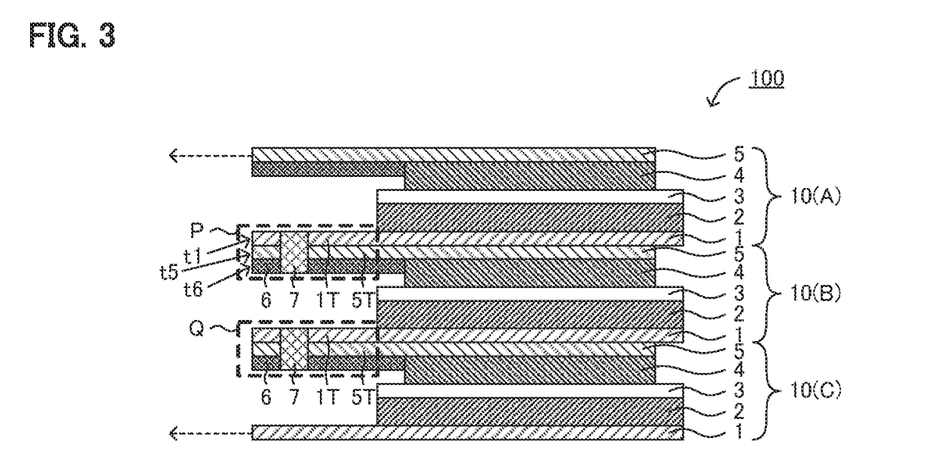
FIG. 3 is a schematic cross-sectional view exemplifying the all solid state battery in the first embodiment.

FIG. 3 is a schematic cross-sectional view exemplifying the all solid state battery in the first embodiment. All solid state battery 100 shown in FIG. 3 comprises cell A, cell B, and cell C. First current collector 1 (first current collector A) in the cell A and second current collector 5 (second current collector B) in the cell B are arranged to face each other and electronically connected. Similarly, first current collector 1 (first current collector B) in the cell B and second current collector 5 (second current collector C) in the cell C are arranged to face each other and electronically connected. In these manners, the cells A to C are arranged along the thickness direction and electronically connected.

In FIG. 3, the positions of tab 1T (tab A) in the cell A and tab 5T (tab B) in the cell B are fixed by fixing portion 7. Similarly, the positions of tab 1T (tab B) in the cell B and tab 5T (tab C) in the cell C are fixed by fixing portion 7.

According to the first embodiment, the tab A and the tab B in the cell A and the cell B are fixed by the fixing portion, and thus the shift in positions of a plurality of the cells arranged along the thickness direction can be prevented in the all solid state battery.

As described above, when the bipolar electrode, in which a cathode active material layer is arranged on one surface of a current collector and an anode active material layer is arranged on the other side of the current collector, is used, depending on conditions for pressing, difference in elasticity between the anode active material layer and the cathode active material layer may cause deformation of a current collector, which may generate a crack in the anode active material layer or the cathode active material layer. In contrast, in the cell of the first embodiment, an active material layer is arranged on only one surface side of the current collector, and thus the crack in the active material layer due to pressing does not easily occur compared with the bipolar electrode.

In an all solid state battery wherein a plurality of cells are arranged along a thickness direction, each cell may move to in-plane direction (orthogonal direction to the thickness direction) during being pressed (during pressing a plurality of the cells after arranging the cells along the thickness direction) and shift in positions of the cells tends to occur. The shift in positions of the cells can be a cause of short circuit. Particularly in an all solid state battery using an inorganic solid electrolyte, pressing with extremely high pressure is conducted in order to form good ion conducting path, and thus it is presumed that short circuit due to the shift in positions tends to occur. Necessity of pressing with extremely high pressure and the tendency of occurrence of short circuit due to the shift in positions along with the said pressing can be said the peculiar problems to an all solid state battery.

To these problems, in the first embodiment, the tab A and the tab B are fixed by the fixing portion. Thus, the shift in positions can be prevented even when pressing with extremely high pressure is conducted. As a result, occurrence of short circuit can be suppressed. Incidentally, in a conventional bipolar electrode, a current collector works as both a cathode current collector and an anode current collector, and thus the arrangement of the current collecting tab in the current collector is not necessary. For this reason, an idea of fixing the cells with the current collecting tab would not occur for the bipolar electrode.

1. Constitution of all Solid State Battery

The all solid state battery in the first embodiment comprises a plurality of cells arranged along a thickness direction and connected in series. Further, the all solid state battery comprises at least a cell A and a cell B as the cells.

The tab A in the cell A and the tab B in the cell B are at least partially overlap in plan view, and fixed by the fixing portion. The fixing portion is not particularly limited as long as it can fix the relative positions of the tab A and the tab B, and in some embodiments, the fixing portion is a welded portion. The welded portion may be formed by a known method. Also, the fixing portion may be an adhesive portion. The adhesive portion may or may not be conductive. The adhesive portion may be formed by using a known adhesive agent. The fixing portion may be formed on a part of or entirely on a region where the tab A and the tab B overlap in plan view.

In some embodiments, a first insulating portion is arranged on at least one of a surface of the tab B facing away from the tab A, and a surface of the tab A facing away from the tab B. The reason therefor is to suppress the occurrence of short circuit.

Here, two tabs fixed by the fixing portion is regarded as a tab structural portion. For example, in FIG. 3, there are tab structural portion P wherein tab A (tab 1T in cell A) and tab B (tab 5T in cell B) are fixed by fixing portion 7, and tab structural portion Q wherein tab B (tab 1T in cell B) and tab C (tab 5T in cell C) are fixed by fixing portion 7. When the tab structural portion P and the tab structural portion Q are electronically connected, short circuit occurs. In FIG. 3, first insulating portion 6 is arranged on a surface of the tab B (tab 5T in cell B) facing away from the tab A (tab 1T in cell A) in the tab structural portion P, and thus the tab structural portion P and the tab structural portion Q can be isolated even when the both contact with each other. Thereby, the occurrence of short circuit can be suppressed. Incidentally, as shown in FIG. 3, when the fixing portion 7 is conductive and formed on also a part of the first insulating portion 6, as described later, in some embodiments, a bent structure may be formed to store the fixing portion 7 inside, or to cover the exposed surface of the fixing portion 7 with an insulating adhesive portion.

Figure 4A:
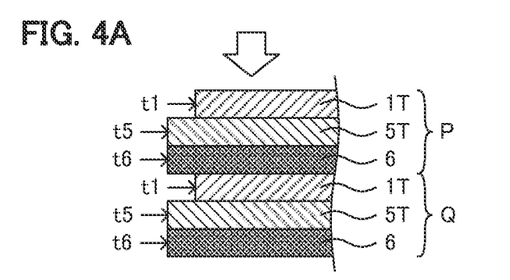
FIG. 4A is a schematic diagram exemplifying a side view of the tab structural portion in which an end part of a first insulating portion extends more from an end part of a tab A in the first embodiment.
Figure 4B:
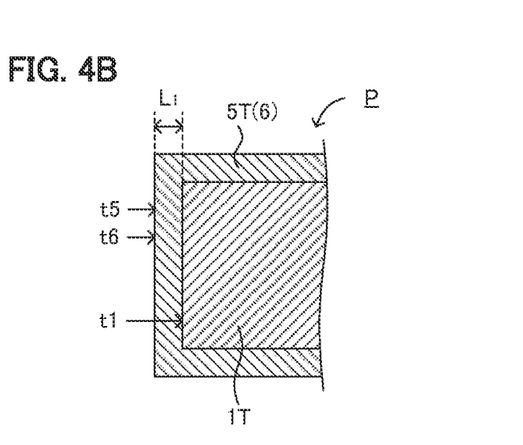
FIG. 4B is a diagram exemplifying a plan view the tab structural portion in which the end part of the first insulating portion extends more from an end part of the tab A in the first embodiment.

In addition, in FIG. 3, the positions of end part t1 of the tab A (tab 1T), end part t5 of the tab B (tab 5T) and end part t6 of the first insulating portion 6 meet. Since the end part of the tab structural portion easily becomes a cause of short circuit, the end part t6 of the first insulating portion 6 may extend more from the end part t1 of tab A (tab 1T), as shown in FIG. 4A. FIG. 4B is a schematic plan view observing FIG. 4A from the arrow direction, in which the outer edge of the first insulating portion 6 is located at outer side with respect to the outer edge of the tab A (tab 1T) in plan view. As shown in FIG. 4B, when the distance between the end part t6 of the first insulating portion 6 and the end part t1 of the tab A (tab 1T) is regarded as $L_1$, the $L_1$ is, for example, 0.1 mm or more, and may be 5 mm or more. On the other hand, the $L_1$ is, for example, 2 cm or less.

Figure 4C:
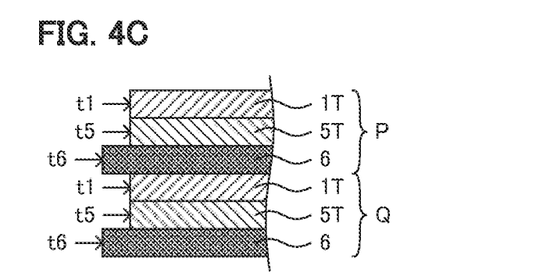
FIG. 4C is a schematic diagram exemplifying a side view of the tab structural portion in which the end part of the first insulating portion extends more from an end part of a tab B in the first embodiment.
Figure 4D:
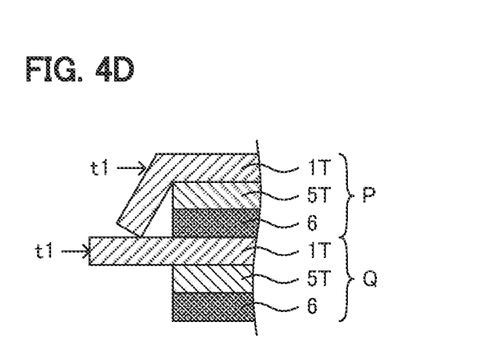
FIG. 4D is a diagram exemplifying a side view the tab structural portion in which an end part of the tab structural portion P contacts an end part of the tab structural portion Q in the first embodiment.

Further, in FIG. 4A, the positions of the end part t5 of the tab B (tab 5T) and the end part t6 of the first insulating portion 6 meet. Meanwhile, as shown in FIG. 4C, the end part t6 of the first insulating portion 6 may extends more from the end part t5 of the tab B (tab 5T). In other words, the outer edge of the first insulating portion 6 may be located at outer side with respect to the outer edge of the tab B (tab 5T) in plan view. On the other hand, as shown in FIG. 4D, when the end part t1 of the tab A (tab 1T) extends more from the end part t6 of the first insulating portion 6, the end part t1 in the tab structural portion P and the end part t1 of the tab structural portion Q may contact with each other depending on their shape to cause short circuit.

FIG. 3 and FIGS. 4A to 4D show the cases where the first insulating portion is arranged on a surface of the tab B facing away from the tab A, but the first insulating portion may be arranged on a surface of the tab A facing away from the tab B as shown in FIG. 5 and FIGS. 6A to 6D.

Figure 5:
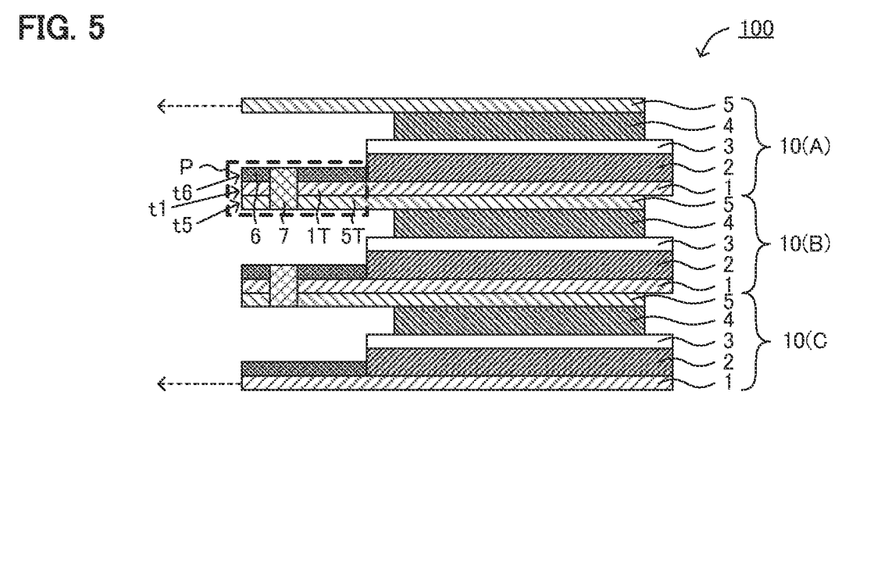
FIG. 5 is a schematic cross-sectional view exemplifying the all solid state battery in the first embodiment.

In FIG. 5, first insulating portion 6 is arranged on a surface of the tab A (tab 1T in cell A) facing away from the tab B (tab 5T in cell B) in the tab structural portion P, and thus the tab structural portion P and the second current corrector A (second current collector 5) in the cell A can be isolated even when the both contact with each other. Thereby, the occurrence of short circuit can be suppressed. Incidentally, as shown in FIG. 5, when the fixing portion 7 is conductive and formed on also a part of the first insulating portion 6, as described later, in some embodiments, a bent structure may be formed to store the fixing portion 7 inside, or to cover the exposed surface of the fixing portion 7 with an insulating adhesive portion.

Figure 6A:
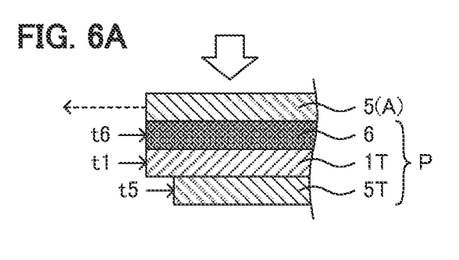
FIG. 6A is a schematic diagram exemplifying a side view of the tab structural portion in which the end part of the first insulating portion may extend more from the end part of the tab B in the first embodiment.
Figure 6B:
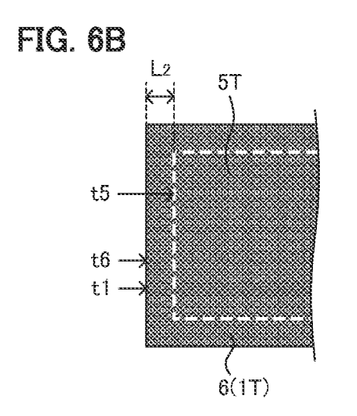
FIG. 6B is a diagram exemplifying a plan view the tab structural portion in which the end part of the first insulating portion extends more from the end part of the tab B in the first embodiment.

In addition, in FIG. 5, the positions of end part t6 of the first insulating portion 6, end part t1 of the tab A (tab 1T), and end part t5 of the tab B (tab 5T) meet. Since the end part of the tab structural portion easily becomes a cause of short circuit, the end part t6 of the first insulating portion 6 may extend more from the end part t5 tab B (tab 5T), as shown in FIG. 6A. FIG. 6B is a schematic plan view observing FIG. 6A from the arrow direction (description of second current collector 5 in cell A is omitted for convenience), in which the outer edge of the first insulating portion 6 is located at outer side with respect to the outer edge of the tab B (tab 5T) in plan view. As shown in FIG. 6B, when the distance between the end part t6 of the first insulating portion 6 and the end part t5 of the tab B (tab 5T) is regarded as $L_2$, the range of the $L_2$ may be the same as that of the $L_1$ described above.

Figure 6C:
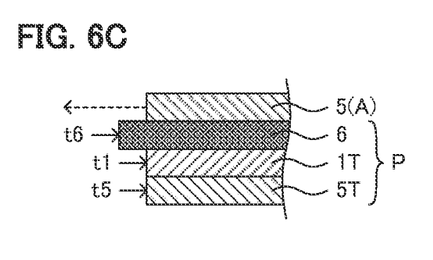
FIG. 6C is a diagram exemplifying a side view the tab structural portion in which the end part of the first insulating portion extends more from the end part of the tab A in the first embodiment.
Figure 6D:
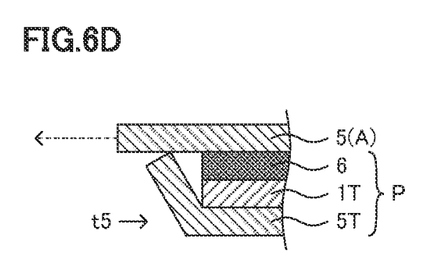
FIG. 6D is a diagram exemplifying a side view the tab structural portion in which the end part of the tab B contacts a second current collector.

Further, in FIG. 6A, the positions of the end part t1 of the tab A (tab 1T) and the end part t6 of the first insulating portion 6 meet. Meanwhile, as shown in FIG. 6C, the end part t6 of the first insulating portion 6 may extends more from the end part t1 of the tab A (tab 1T). In other words, the outer edge of the first insulating portion 6 may be located at outer side with respect to the outer edge of the tab A (tab 1T) in plan view. On the other hand, as shown in FIG. 6D, when the end part t5 of the tab B (tab 5T) extends more from the end part t6 of the first insulating portion 6, the end part t5 of the tab B (tab 5T) and the second current collector A (second current collector 5) in the cell A may contact with each other depending on their shape to cause short circuit.

As an example of the material for the first insulating portion, a resin may be exemplified. Examples of the resin may include polyolefin such as polyethylene and polypropylene; polyester such as polyethylene terephthalate (PET); polyurethane, and polyimide. An additional example of the material for the first insulating portion may be a metal oxide. For example, a coat of metal oxide may be formed by oxidizing the surface of the current collector, and the coat may be used as the first insulating portion. When an area of a tab is regarded as $S_1$ and an area of the first insulating portion overlapping with the tab in plan view is regarded as $S_2$, the value of $S_2$ to $S_1$ is, for example, 70% or more, may be 90% or more, and may be 100%.

Figure 7A:
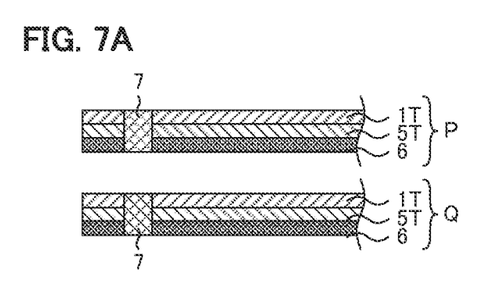
FIG. 7A is a schematic cross-sectional view exemplifying the tab structural portion having a fixing portion in the first embodiment.
Figure 7B:
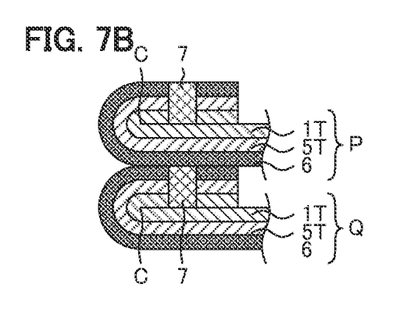
FIG. 7B is a schematic cross-sectional view exemplifying the tab structural portion in which the fixing portion may be located on an inner side with respect to a bending center in the first embodiment.

Further, FIG. 7A shows the tab structural portion P and the tab structural portion Q in the same manner as in FIG. 3. As shown in FIG. 7B, tab A (tab 1T) and tab B (tab 5T) in the tab structural portion P may be bent so as the first insulating portion 6 is on an outside. In addition, fixing portion 7 may be located on an inner side with respect to bending center C. By forming such a bent structure, occurrence of short circuit due to the fixing portion 7 can be effectively suppressed. "Inner side" means a direction where the power generating element (first active material layer, solid electrolyte layer, second active material layer) is present in the in-plane direction; in FIG. 7B, the direction corresponds to the right side space. Incidentally, "inner side" may be also referred to as "power generating element side". Further, as shown in FIG. 7B, the tab A (tab 1T) and the tab B (tab 5T) in the tab structural portion P may be bent so as the tab A faces to itself. In the case of forming the bent structure, from the view point of flexibility, the material of the first insulating portion may be polyolefin or polyurethane. In particular, the first insulating portion may have a sole layer structure, or may have a multiple layer structure. Specific examples of the first insulating portion having the sole layer structure may include a first insulating portion containing polyolefin such as polyethylene and polypropylene. Specific examples of the first insulating portion having the multiple layer structure may include a first insulating portion that includes a layer containing polyolefin such as polyethylene and polypropylene, and a layer containing polyester such as PET. On the other hand, from the view point of thermal resistance, the material for the first insulating portion may be polyimide or polyester.

Figure 8A:
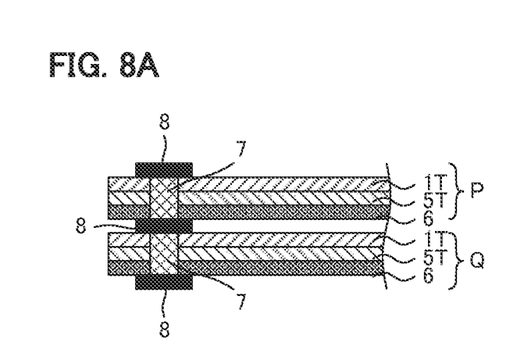
FIG. 8A is a schematic cross-sectional view exemplifying the tab structural portion having an insulating adhesive portion in the first embodiment.
Figure 8B:
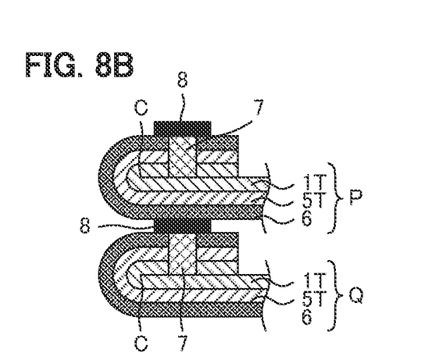
FIG. 8B is a schematic cross-sectional view exemplifying the tab structural portion in which the insulating adhesive portion is arranged on an exposed surface of the fixing portion in the first embodiment.

In addition, as shown in FIG. 8A, insulating adhesive portion 8 may be arranged on at least one surface side of the fixing portion 7. By covering the fixing portion 7, occurrence of short circuit due to the fixing portion 7 can be effectively suppressed. Further, as shown in FIG. 8B, the tab A (tab 1T) and the tab B (tab 5T) may be bent so as the first insulating portion 6 is on an outside. Furthermore, the fixing portion 7 may be located on an inner side with respect to bending center C, and the insulating adhesive portion 8 may be arranged on the exposed surface of the fixing portion 7. By arranging the insulating adhesive portion 8, deformation of the bent structure due to, for example, vibration can be prevented. In this case, the fixing portion is located on inner side with respect to the bending center C, and thus insulation quality of the insulating adhesive portion 8 does not need to be high. An arbitrary adhesive portion instead of the insulating adhesive portion 8 may be used. Also, although not illustrated in particular, a plurality of the tab structural parts in the bent state so as the first insulating portion is on outside may be fixed by thermal welding, or may be fixed by embedding with a resin such as an ultraviolet curing resin.

The all solid state battery in the first embodiment comprises a plurality of cells arranged along a thickness direction and connected in series. The number of the cells is at least two or more, may be 3 or more, may be 10 or more, and may be 20 or more. On the other hand, the number of the cells is, for example, 1000 or less, and may be 500 or less. When the number of the cells is 3 or more, two of the cells facing to each other may have the same relationship as the relationship between the cell A and the cell B described above. In addition, the all solid state battery usually comprises an outer package for storing a plurality of the cells. The outer package may or may not be flexible. As an example of the former case, an aluminum laminate film can be exemplified. As an example of the latter case, a cell case can be exemplified. Further, the all solid state battery may be a primary battery and may be a secondary battery. The reason therefor is to be repeatedly charged and discharged, and useful as, for example, a car-mounted battery.

2. Constitution of Cell Unit

The all solid state battery in the first embodiment comprises a plurality of cells arranged along a thickness direction and connected in series.

The cells respectively include a first current collector, a first active material layer, a solid electrolyte layer, a second active material layer and a second current collector, in this order. The kind of the cells is not particularly limited, and in some embodiments, the cells are a lithium ion battery.

The first current collector may be an anode current collector, and may be a cathode current collector. In the former case, the second current collector would be a cathode current collector, and in the latter case, the second current collector would be an anode current collector. Examples of the material for the cathode current collector may include aluminum, SUS, nickel, and carbon. Examples of the material for the anode current collector may include copper, SUS, nickel, and carbon. Examples of the shape of the current collector may include a foil shape.

The first current collector includes a tab at a position not overlapping the first active material layer. Here, when a part of the first current collector overlapping the first active material layer in planar view is regarded as an overlapping portion, the material of the tab may be the same material as that of the overlapping portion. In some embodiments, the first current collector is formed continuously from the overlapping portion to the tab. Regarding these points, the same applies to the second current collector.

The first active material layer may be an anode active material layer and may be a cathode active material layer. In the former case, the second active material layer would be a cathode active material layer, and in the latter case, the second current collector would be an anode active material layer. In some embodiments, the electrode area of the anode active material layer may be larger than the electrode area of the cathode active material layer. The reason therefore is to obtain an all solid state battery with higher safety. The active material layer contains at least an active material, and may contain at least one of a solid electrolyte, a conductive material, and a binder.

Examples of the cathode active material may include an oxide active material. Examples of the oxide active material may include a rock salt bed type active material such as $LiCoO_2$, $LiMnO_2$, $LiNiO_2$, $LiVO_2$, and $LiNi_{1/3}Co_{1/3}Mn_{1/3}O_2$; a spinel type active material such as $LiMn_2O_4$, $Li(Ni_{0.5}Mn_{1.5})O_4$, and $Li_4Ti_5O_{12}$; and an olivine type active material such as $LiFePO_4$, $LiMnPO_4$, $LiNiPO_4$, and $LiCoPO_4$. Examples of the shape of the cathode active material may include a granular shape.

Examples of the anode active material may include a metal active material, a carbon active material, and an oxide active material. Examples of the metal active material may include Li, In, Al, Si, Sn, and an alloy including at least one kind of these. Examples of the carbon active material may include graphite, hard carbon, and soft carbon. Examples of the oxide active material may include $Li_4Ti_5O_{12}$, SiO, and $Nb_2O_5$. Examples of the shape of the anode active material may include a granular shape.

Examples of the solid electrolyte may include an inorganic solid electrolyte such as a sulfide solid electrolyte, an oxide solid electrolyte, a nitride solid electrolyte, and a halide solid electrolyte. In some embodiments, the sulfide solid electrolyte contains, for example, a Li element, an X element (X is at least one kind of P, As, Sb, $S_1$, Ge, Sn, B, Al, Ga, and In), and a S element. Also, the sulfide solid electrolyte may further contain at least one of an O element and a halogen element. Examples of the shape of the solid electrolyte may include a granular shape. In addition, examples of the conductive material may include a carbon material. Further, examples of the binder may include a rubber-based binder and a fluoride-based binder.

The solid electrolyte layer contains at least a solid electrolyte, and may contain a binder as required. The solid electrolyte and the binder are as described above.

B. Second Embodiment

Figure 9:
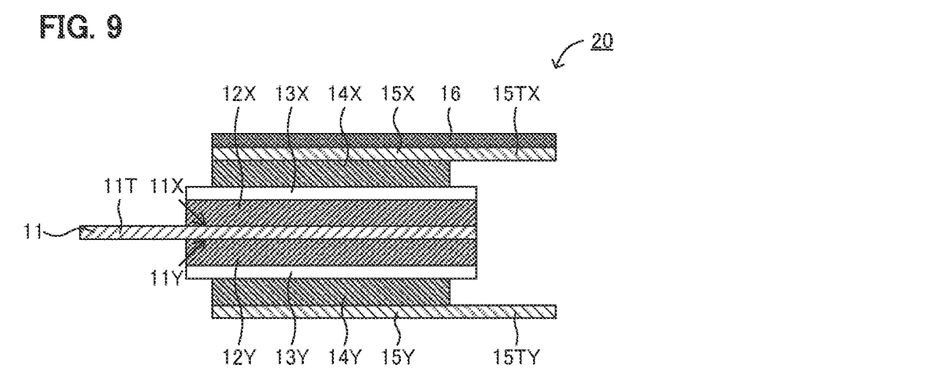
FIG. 9 is a schematic cross-sectional view exemplifying the cell unit in a second embodiment.

FIG. 9 is a schematic cross-sectional view exemplifying the cell unit in the second embodiment. Cell unit 20 illustrated in FIG. 9 includes first current collector 11, and first active material layer 12X, solid electrolyte layer 13X, second active material layer 14X and second current collector 15X, arranged in order from first surface 11X side of the first current collector 11, and first active material layer 12Y, solid electrolyte layer 13Y, second active material layer 14Y and second current collector 15Y, arranged in order from second surface 11Y side opposite to the first surface 11X side of the first current collector 11. The second current collector 15X includes tab 15TX at a position not overlapping the second active material layer 14X in plan view. The second current collector 15Y includes tab 15TY at a position not overlapping the second active material layer 14Y in plan view. The first current collector 11 includes tab 11T at a position not overlapping the first active material layer 12X and the first active material layer 12Y in planar view. In addition, first insulating portion 16a is arranged on one surface side of the tab 15TX.

Figure 10:
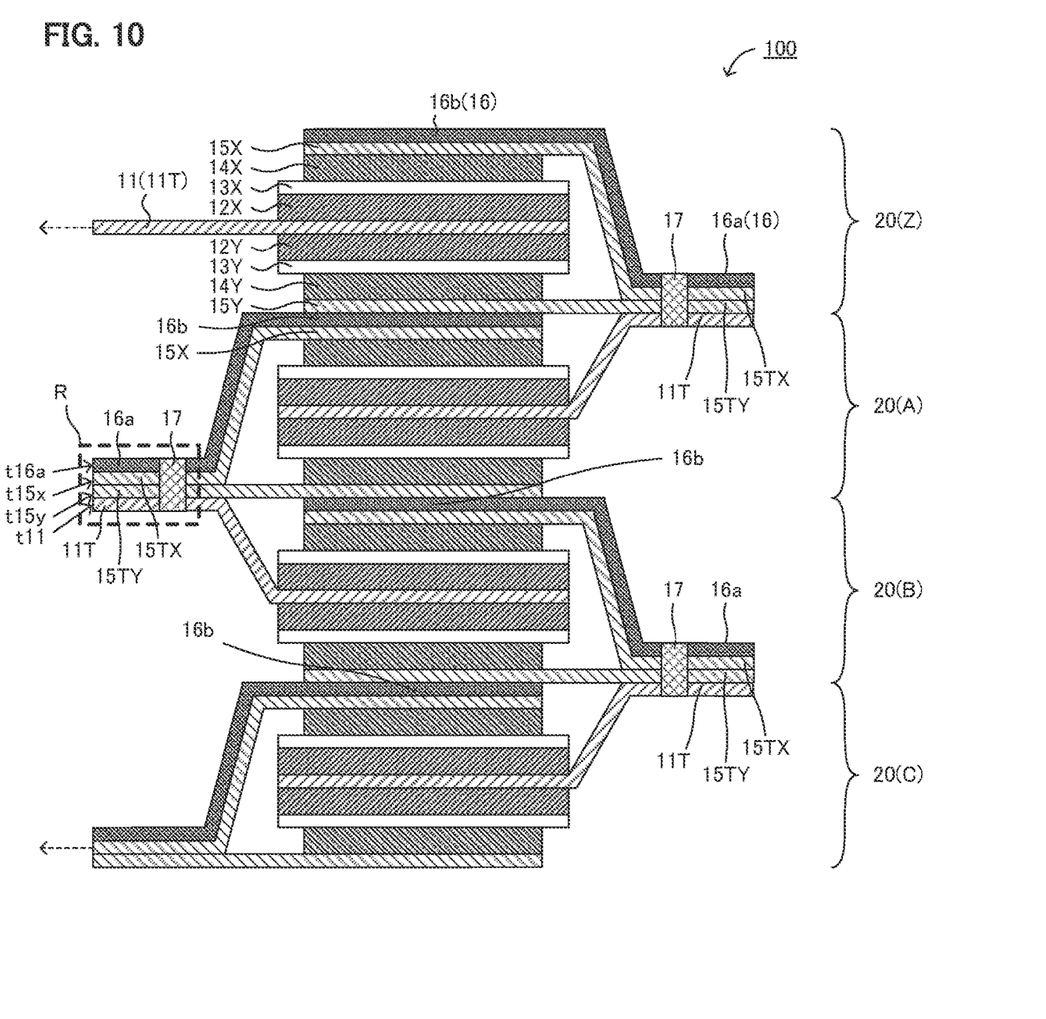
FIG. 10 is a schematic cross-sectional view exemplifying the all solid state battery in the second embodiment.

FIG. 10 is a schematic cross-sectional view exemplifying the all solid state battery of the second embodiment. All solid state battery 100 illustrated in FIG. 10 comprises cell unit Z and cell units A to C. Second current collector 15Y (second current collector AY) in the cell unit A, and the second current collector 15X (second current collector BX) in the cell unit B are arranged to face each other interposing second insulating portion 16b. Similarly, second insulating portion 16b is respectively arranged between the cell unit Z and the cell unit A, and between the cell unit B and the cell unit C.

In FIG. 10, the positions of the tab 15TX (tab AX) in the cell unit A, the tab 15TY (tab AY) in the cell unit A, and the tab 11T (tab B) in the cell unit B are fixed by fixing portion 17. Similarly, the positions of the tab 15TX (tab ZX) in the cell unit Z, the tab 15TY (tab ZY) in the cell unit Z, and the tab 11T (tab A) in the cell unit A are fixed by fixing portion 17. Similarly, the positions of the tab 15TX (tab BX) in the cell unit B, the tab 15TY (tab BY) in the cell unit B, and the tab 11T (tab C) in the cell unit C are fixed by fixing portion 17. In these manners, the cell unit Z and the cell units A to C are arranged along a thickness direction, and connected in series.

According to the second embodiment, the tab AX, the tab AY, and the tab B in the cell unit A and the cell unit B are fixed by the fixing portion, and thus the shift in positions of a plurality of the cells arranged along the thickness direction can be prevented in the all solid state battery.

As described above, when the bipolar electrode, in which a cathode active material layer is arranged on one surface of a current collector and an anode active material layer is arranged on the other side of the current collector, is used, depending on conditions for pressing, difference in elasticity between the anode active material layer and the cathode active material layer may cause deformation of a current collector, which may generate a crack in the anode active material layer or the cathode active material layer. In contrast, with the cell unit in the second embodiment, the first active material layer X and the first active material layer Y, that are the same pole, are arranged on the both surfaces of the first current collector, and thus the deformation due to the difference in elasticity between the active material layers can be suppressed. Further, with the cell unit in the second embodiment, two cells are formed on the both surfaces of the first current collector (which means that the first current collector works as the current collector for both of the two cells), and thus the energy density can be improved, for example, compared with the case of using two of the cells in the first embodiment.

1. Constitution of all Solid State Battery

The all solid state battery in the second embodiment comprises a plurality of cell units arranged along a thickness direction and connected in series. In addition, the all solid state battery comprises at least a cell unit A and a cell unit B as the cell units.

Each of tab AX in the cell unit A, tab AY in the cell unit A, and tab B in the cell unit B are at least partially overlaps in plan view and fixed by a fixing portion. The fixing portion is not particularly limited as long as it can fix the relative positions of the tab AX, the tab AY and the tab B. The fixing portion may be formed on a part of a region where the tab AX, the tab AY, and the tab B overlap in plan view, or may be formed entirely on the region.

In some embodiments, a first insulating portion may be arranged on a surface of the tab AX facing away from the tab AY. The reason therefor is to suppress the occurrence of short circuit.

Here, three tabs fixed by the fixing portion is regarded as a tab structural portion. For example, in FIG. 10, there is tab structural portion R wherein tab AX (tab 15TX in cell unit A), tab AY (tab 15TY in cell unit A) and tab B (tab 11T in cell unit B) are fixed by fixing portion 17. In FIG. 10, first insulating portion 16a is arranged on a surface of the tab AX facing away from the tab AY in the tab structural portion R, and thus the tab structural portion R and first current collector Z (first current collector 11) in the cell unit Z can be isolated even when the both contact with each other. Thereby, the occurrence of short circuit can be suppressed. Incidentally, as shown in FIG. 10, when the fixing portion 17 is conductive and formed on also a part of the first insulating portion 16a, as described later, a bent structure may be formed to store the fixing portion 17 inside, or to cover the exposed surface of the fixing portion 17 with an insulating adhesive portion.

In some embodiments, as shown in FIG. 10, the first insulating portion 16a and the second insulating portion 16b may be formed continuously on a surface of the second current collector 15X facing away from the second active material layer 14X. In FIG. 10, insulating layer 16 is arranged on a surface of the second current collector 15X facing away from the second active material layer 14X, and a part of the insulating layer 16 is used as the first insulating portion 16a or the second insulating portion 16b. For example, a cell unit wherein the first insulating portion 16a and the second insulating portion 16b are continuously formed can be obtained by producing a cell unit using a stacked bod in which an insulating layer is arranged on one surface side of a current collector. In the stacked body, the insulating layer in plan view covers the entire surface of the current collector.

Figure 11A:
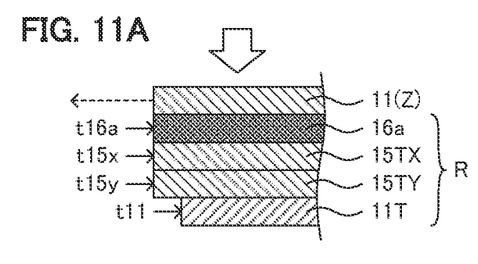
FIG. 11A is a schematic diagram exemplifying a side view of the tab structural portion in which the end part of the first insulating portion extends more from the end part of the tab B in the second embodiment.
Figure 11B:
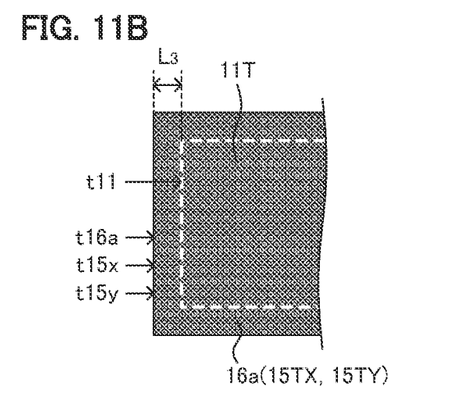
FIG. 11B is a schematic diagram exemplifying a plan view of the tab structural portion in which the end part of the first insulating portion extends more from the end part of the tab B in the second embodiment.

In addition, in FIG. 10, the positions of end part t16a of the first insulating portion 16a, end part t15x of the tab AX (tab 15TX), end part t15y of the tab AY (tab 15TY), and end part t11 of the tab B (tab 11T) meet. Since the end part of the tab structural portion easily becomes a cause of short circuit, the end part t16a of the first insulating portion 16a may extend more from the end part t11 of the tab B (tab 11T), as shown in FIG. 11A. FIG. 11B is a schematic plan view observing FIG. 11A from the arrow direction (description of first current collector 11 in cell unit Z is omitted for convenience), in which the outer edge of the first insulating portion 16a is located at outer side with respect to the outer edge of the tab B (tab 11T) in plan view. As shown in FIG. 11B, when the distance between the end part t16a of the first insulating portion 16a and the end part t11 of the tab B (tab 11T) is regarded as $L_3$, the range of the $L_3$ may be the same as that of the $L_1$ described above.

Figure 11C:
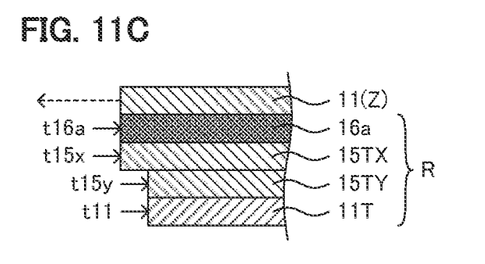
FIG. 11C is a schematic diagram exemplifying a side view of the tab structural portion in which the end part of the first insulating portion may extend more from an end part of a tab AY the in the second embodiment.
Figure 11D:
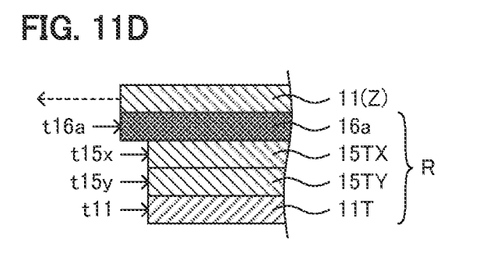
FIG. 11D is a schematic diagram exemplifying a side view of the tab structural portion in which the end part of the first insulating portion may extend more from an end part of a tab AX in the second embodiment.
Figure 11E:
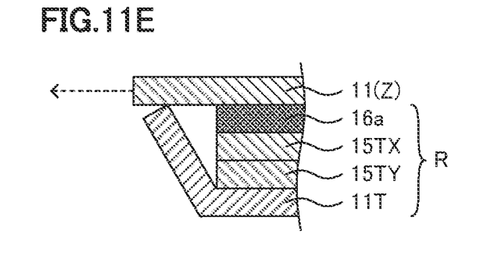
FIG. 11E is a schematic diagram exemplifying a side view of the tab structural portion in which the end part of the tab B contacts a first current collector in the second embodiment.

Further, in FIG. 11A, the positions of the end part t15x of the tab AX (tab 15TX), the end part t15y of the tab AY (tab 15TY) and the end part t16a of the first insulating portion 16a meet. Meanwhile, as shown in FIG. 11C, the end part t16a of the first insulating portion 16a may extends more from the end part t15y of the tab AY (tab 15TY). In other words, the outer edge of the first insulating portion 16a may be located at outer side with respect to the outer edge of the tab AY (tab 15TY) in plan view. Similarly, as shown in FIG. 11D, the end part t16a of the first insulating portion 16a may extends more from the end part t15x of the tab AX (tab 15TX). In other words, the outer edge of the first insulating portion 16a may be located at outer side with respect to the outer edge of the tab AX (tab 15TX) in plan view. On the other hand, as shown in FIG. 11E, when the end part t11 of the tab B (tab 11T) extends more from the end part t16a of the first insulating portion 16a, the end part t11 of the tab B (tab 11T) and the first current collector Z (first current collector 11) in the cell unit Z may contact with each other depending on their shape to cause short circuit.

Figure 12A:
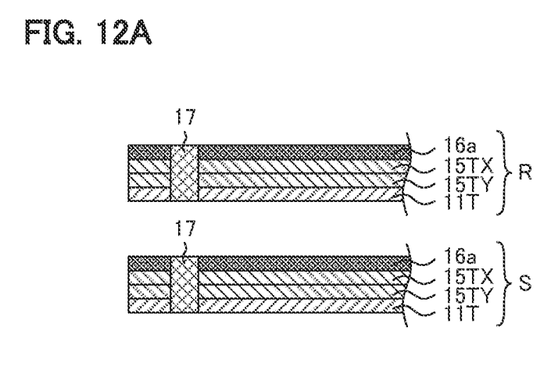
FIG. 12A is a schematic cross-sectional view exemplifying the tab structural portion having a fixing portion in the second embodiment.
Figure 12B:
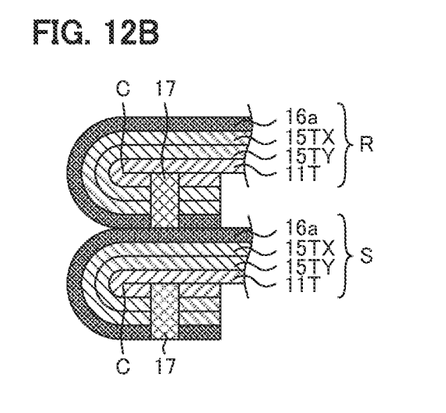
FIG. 12B is a schematic cross-sectional view exemplifying the tab structural portion having the fixing portion located on an inner side with respect to a bending center in the second embodiment.

Further, FIG. 12A shows the tab structural portion R same as in FIG. 10 and tab structural portion S adjacent to the tab structural portion R. As shown in FIG. 12B, tab AX (tab 15TX), tab AY (tab 15TY) and tab B (tab 11T) in the tab structural portion R may be bent so as the first insulating portion 16a is on an outside. In addition, fixing portion 17 may be located on inner side with respect to bending center C. By forming such a bent structure, occurrence of short circuit due to the fixing portion 17 can be effectively suppressed. Further, as shown in FIG. 12B, the tab AX (tab 15TX), the tab AY (tab 15TY) and the tab B (tab 11T) in the tab structural portion R are bent so as the tab B (tab 11T) faces itself.

Figure 13A:
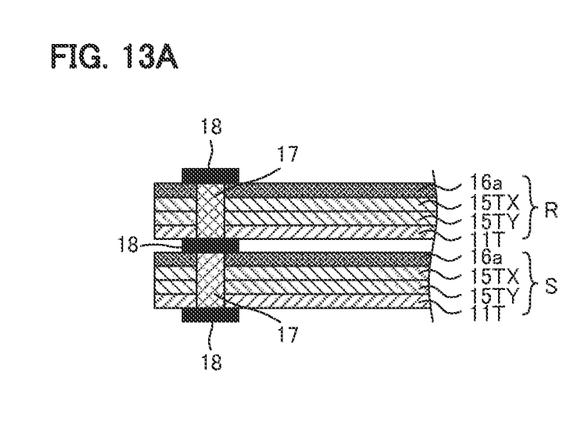
FIG. 13A is a schematic cross-sectional view exemplifying the tab structural portion having an insulating adhesive portion in the second embodiment.
Figure 13B:
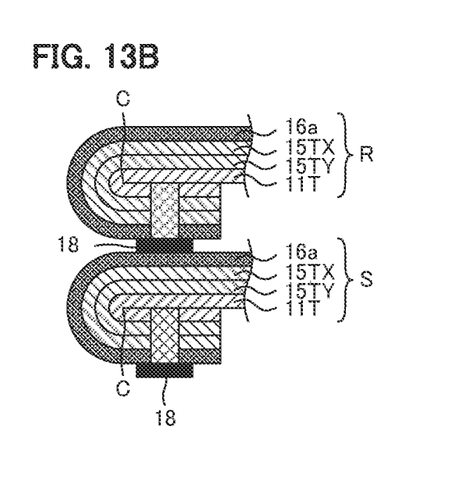
FIG. 13B is a schematic cross-sectional view exemplifying the tab structural portion in which the insulating adhesive portion is arranged on an exposed surface of the fixing portion on in the second embodiment.

In addition, as shown in FIG. 13A, insulating adhesive portion 18 may be arranged on at least one surface side of the fixing portion 17. By covering the fixing portion 17, occurrence of short circuit due to the fixing portion 17 can be effectively suppressed. Further, as shown in FIG. 13B, the tab AX (tab 15TX), the tab AY (tab 15TY) and the tab B (tab 11T) may be bent so as the first insulating portion 16a is on an outside. Furthermore, the fixing portion 17 may be located on an inner side with respect to bending center C, and the insulating adhesive portion 18 may be arranged on the exposed surface of the fixing portion 17. By arranging the insulating adhesive portion 18, deformation of the bent structure due to, for example, vibration can be prevented.

In the present disclosure, a third insulating portion may be arranged on at least one of an end surface, which is the tab AX side surface, of the first active material layer AX, and an end surface, which is the tab AY side surface, of the first active material layer AY. The reason therefor is to suppress the occurrence of short circuit. In addition, in the present disclosure, a fourth insulating portion may be arranged on at least one of an end surface, which is the tab A side surface, of the second active material layer AX, and an end surface, which is the tab A side surface, of the second active material layer AY. The reason therefor is to suppress the occurrence of short circuit. In addition, the fourth insulating portion may cover respectively the end surface of the second current collector 5X in the cell unit A, and the end surface of the second current collector 5Y in the cell unit A. Further, in the present disclosure, a fifth insulating portion may be arranged at a position overlapping the tab structural portion in plan view.

Other constitutions in the all solid state battery of the second embodiment are in the same contents as those described in "A. First embodiment" above; thus, the descriptions herein are omitted. On this occasion, "cell" described in "A. First embodiment" may be read as "cell unit" instead. For example, "the number of the cells" in the first embodiment may be read as "the number of the cell units" instead.

2. Constitution of Cell Unit

The all solid state battery in the second embodiment comprises a plurality of a cell unit arranged along a thickness direction and connected in series.

The cell unit includes: a first current collector; a first active material layer X, a solid electrolyte layer X, a second active material layer X and a second current collector X, arranged along the thickness direction in order from a first surface side of the first current collector; and a first active material layer Y, a solid electrolyte layer Y, a second active material layer Y, and a second current collector Y, arranged along the thickness direction in order from a second surface side opposite to the first surface side of the first current collector. Each layer configured in the cell unit is in the same contents as those described in "A. First embodiment" above; thus, the description herein is omitted.

The present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

REFERENCE SIGNS LIST 1 first current collector
2 first active material layer
3 solid electrolyte layer
4 second active material layer
5 second current collector
6 first insulating portion
7 fixing portion
8 insulating adhesive portion
10 cell
11 first current collector
12 first active material layer
13 solid electrolyte layer
14 second active material layer
15 second current collector
16 insulating layer
16a first insulating portion
16b second insulating portion
17 fixing portion
18 insulating adhesive portion
20 cell unit
100 all solid state battery

What is claimed is:

1. An all solid state battery comprising a plurality of cells arranged along a thickness direction and connected in series,
the all solid state battery includes a cell A and a cell B as the cells,
the cell A includes a first current collector A, a first active material layer A, a solid electrolyte layer A, a second active material layer A and a second current collector A, in this order,
the cell B includes a first current collector B, a first active material layer B, a solid electrolyte layer B, a second active material layer B and a second current collector B, in this order,
the first current collector A in the cell A and the second current collector B in the cell B are arranged to face each other,
the first current collector A includes a tab A at a position not overlapping with the first active material layer A in plan view, the second current collector B includes a tab B at a position not overlapping with the second active material layer B in plan view, and the tab A and the tab B are fixed by a fixing portion, wherein a first insulating portion is arranged on a surface of the tab B facing away from the tab A, an outer edge of the first insulating portion is located on an outer side with respect to an outer edge of the tab A in plan view, and the tab A and the tab B are bent so as the first insulating portion is on an outside, and the fixing portion is located on an inner side with respect to a bending center.

2. The all solid state battery according to claim 1, wherein an outer edge of the tab B is located on the outer side with respect to the outer edge of the tab A in plan view.

3. The all solid state battery according to claim 1, wherein an insulating adhesive portion is arranged on at least one surface of the fixing portion.

4. The all solid state battery according to claim 1, wherein the fixing portion is a welded portion.

5. An all solid state battery comprising a plurality of cell units arranged along a thickness direction and connected in series, the all solid state battery includes a cell unit A and a cell unit B as the cell units, the cell unit A includes:

a first current collector A, a first active material layer AX, a solid electrolyte layer AX, a second active material layer AX and a second current collector AX, arranged in order from a first surface side of the first current collector A, and a first active material layer AY, a solid electrolyte layer AY, a second active material layer AY and a second current collector AY, arranged in order from a second surface side opposite to the first surface side of the first current collector A, the cell unit B includes:

a first current collector B, and a first active material layer BX, a solid electrolyte layer BX, a second active material layer BX and a second current collector BX, arranged in order from a first surface side of the first current collector B, a first active material layer BY, a solid electrolyte layer BY, a second active material layer BY and a second current collector BY, arranged in order from a second surface side opposite to the first surface side of the first current collector B, the second current collector AY in the cell unit A, and the second current collector BX in the cell unit B are arranged to face each other, interposing a second insulating portion, the second current collector AX includes a tab AX at a position not overlapping with the second active material layer AX in plan view, the second current collector AY includes a tab AY at a position not overlapping with the second active material layer AY in plan view, the first current collector B includes a tab B at a position not overlapping with the first active material layer BX and the first active material layer BY in plan view, and the tab AX, the tab AY, and the tab B are fixed by a fixing portion, a first insulating portion is arranged on a surface of the tab AX facing away from the tab AY, an outer edge of the first insulating portion is located on an outer side of an outer edge with respect to the tab B in plan view, and the tab AX, the tab AY, and the tab B are bent so as the first insulating portion is on an outer side and the fixing portion is located on an inner side with respect to a bending center.

6. The all solid state battery according to claim 5, wherein an outer edge of the tab AX is located on the outer side with respect to the outer edge of the tab B in plan view.

7. All solid state battery according to claim 5, wherein an insulating adhesive portion is arranged on at least one surface of the fixing portion.

8. The all solid state battery according to claim 5, wherein the fixing portion is a welded portion.

* * * * *